United States Patent
Vanhees

(10) Patent No.: US 12,496,109 B2
(45) Date of Patent: Dec. 16, 2025

(54) IMPLANTABLE PLATE AND METHOD OF MANUFACTURING THEREOF

(71) Applicants: Universiteit Antwerpen, Antwerp (BE); MoRe Institute vzw, Deurne (BE); Dr. Matthias Vanhees BVBA, Antwerp (BE)

(72) Inventor: Matthias Vanhees, Antwerp (BE)

(73) Assignees: Universiteit Antwerpen, Antwerp (BE); MoRe Institute VZW, Deurne (BE); Dr. Matthias Vanhees BVBA, Antwerp (BE)

(*) Notice: Subject to any disclaimer, the term of this patent is extended or adjusted under 35 U.S.C. 154(b) by 547 days.

(21) Appl. No.: 17/781,332

(22) PCT Filed: Dec. 7, 2020

(86) PCT No.: PCT/EP2020/084957
§ 371 (c)(1),
(2) Date: May 31, 2022

(87) PCT Pub. No.: WO2021/111013
PCT Pub. Date: Jun. 10, 2021

(65) Prior Publication Data
US 2023/0000557 A1    Jan. 5, 2023

(30) Foreign Application Priority Data
Dec. 5, 2019 (EP) .................. 19213859

(51) Int. Cl.
*A61B 17/80* (2006.01)
*A61B 17/17* (2006.01)
(Continued)

(52) U.S. Cl.
CPC ...... *A61B 17/8061* (2013.01); *A61B 17/1728* (2013.01); *A61B 17/8014* (2013.01);
(Continued)

(58) Field of Classification Search
CPC ............ A61B 17/8061; A61B 17/1728; A61B 17/8014; A61B 17/8047; A61B 2034/105;
(Continued)

(56) References Cited

U.S. PATENT DOCUMENTS 6,302,887 B1 * 10/2001 Spranza ............... A61B 17/861
411/338
8,439,955 B2 * 5/2013 Sixto, Jr. ............... B25B 27/026
606/283

(Continued)

FOREIGN PATENT DOCUMENTS

WO    2017127887    9/2017

OTHER PUBLICATIONS

Extended European Search Report from European Application No. 19213859.2 (filed Dec. 5, 2019), mailed Jun. 19, 2020.
(Continued)

*Primary Examiner* — Jessica Weiss

(57) ABSTRACT

The present invention concerns a method for obtaining an implantable plate for healing a fractured joint of a patient, comprising the steps of: 1) providing a 3D representation of a bone structure in a zone around a joint fracture, the zone comprising essentially all fragments of broken or ruptured bones and at least the ends of unbroken bones which form part of the fractured joint; 2) identifying different bone fragments within said 3D representation; 3) simulating a reduction of said bone fragments into a full joint; 4) calculating optimal parameter values for an implantable plate; 5) obtaining the implantable plate taking into account the calculated parameter values, whereby in step 3, the reduction is simulated by automatedly fitting positions and orientations of said bone fragments to a 3D representation of a healthy joint of said patient.

15 Claims, 6 Drawing Sheets

(51) Int. Cl.
*A61B 34/10* (2016.01)
*B22F 10/80* (2021.01)
*B29C 64/386* (2017.01)
*B33Y 50/00* (2015.01)
*B33Y 80/00* (2015.01)
*A61B 17/00* (2006.01)
*A61B 17/56* (2006.01)
*B22F 10/28* (2021.01)
*B29L 31/00* (2006.01)

(52) U.S. Cl.
CPC .......... *A61B 17/8047* (2013.01); *A61B 34/10* (2016.02); *B22F 10/80* (2021.01); *B29C 64/386* (2017.08); *B33Y 50/00* (2014.12); *B33Y 80/00* (2014.12); *A61B 2017/00526* (2013.01); *A61B 2017/568* (2013.01); *A61B 2034/105* (2016.02); *A61B 2034/108* (2016.02); *B22F 10/28* (2021.01); *B29K 2995/006* (2013.01); *B29L 2031/7532* (2013.01)

(58) Field of Classification Search
CPC .............. A61B 2034/108; A61B 34/10; A61B 2017/568; A61B 2017/00526; B33Y 50/00; B33Y 80/00
USPC .................................................. 606/280–299
See application file for complete search history.

(56) References Cited

U.S. PATENT DOCUMENTS

| | | | | |
|---|---|---|---|---|
| 2004/0102775 | A1* | 5/2004 | Huebner | A61B 17/8052 606/907 |
| 2009/0118770 | A1* | 5/2009 | Sixto, Jr. | A61B 17/8061 606/301 |
| 2010/0152782 | A1* | 6/2010 | Stone | A61B 17/809 606/88 |
| 2011/0082367 | A1* | 4/2011 | Regazzoni | A61B 34/20 600/425 |
| 2013/0325072 | A1* | 12/2013 | Tan | A61B 17/8615 606/286 |
| 2016/0157751 | A1* | 6/2016 | Mahfouz | A61B 5/062 600/409 |

OTHER PUBLICATIONS

International Search Report and Written Opinion from PCT Application No. PCT/EP2020/084957 (filed Dec. 7, 2020), mailed Mar. 25, 2021.

J. G. G. Dobbe, J.C. Vroemen, S. D. Strackee, G. J. Streekstra, "Patient-tailored plate for bone fixation and accurate 3D positioning in corrective osteotomy," Med Biol Eng Comput (2013) 51:19-27.

* cited by examiner

Fig. 7A
Fig. 7B
Fig. 7C
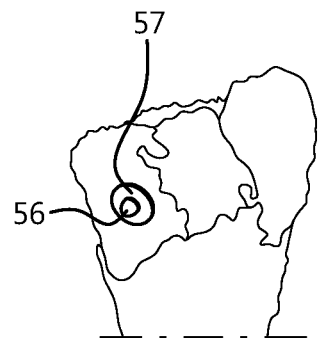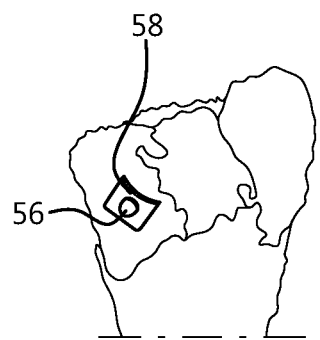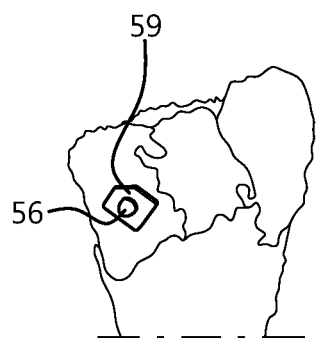
Fig. 8
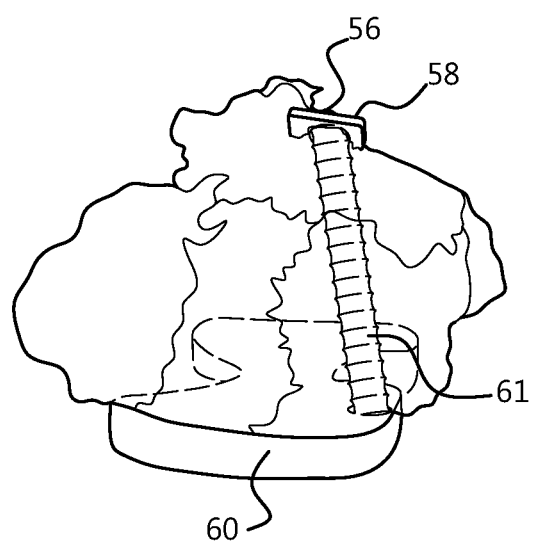

IMPLANTABLE PLATE AND METHOD OF MANUFACTURING THEREOF

TECHNICAL FIELD

The present invention relates to the technical field of implantable plates used for healing fractures of joints or close to joints. The present invention also relates to a method of manufacturing such implantable plates.

BACKGROUND

Fractures close to joints are notoriously difficult to treat. One of the most common fractures close to a joint are distal radius wrist fractures (32.000 cases/year in Belgium). Today, use is made of fixed-shape implants: a set containing a limited number of plates of different sizes is available to the surgeon to select from. Typically the set may consist of implants of three different widths with a variety of lengths. The selection, however, basically comes down to a selection of the size which would most likely fit the patient. At best, one can only hope that the selected plate will fit nicely in the patient's body and will provide enough support at the fractured joint.

A number of issues arise when using fixed-shape implants: they tend to cause friction on the soft tissues and there is a lack of sufficient fixation options. Complications occur in up to 36% of the patients:
- hardware (HW) failures, e.g. the implant bends or even breaks;
- tendon ruptures, e.g. because of the friction of the tendon with an implant which is slightly oversized or does not follow well the natural curves of the bones;
- malunions.

As a consequence, and due to the recent advancements in three-dimensional (3D) printing techniques, patient-specific or patient-engineered implants could be designed and manufactured. For instance, document WO2014047514A1 discloses methods and systems for improving the quality, throughput and efficiency of Solid Free Form manufacture of implant components. Herein, it is explained that the joint replacement field has come to embrace the concept of "patient-specific" and "patient-engineered" implant systems. With such systems, the implants, associated tools, and procedures are designed or otherwise modified to account for and accommodate the individual anatomy of the patient undergoing the surgical procedure. Such systems typically utilize non-invasive imaging data, taken of the patient pre-operatively, to guide the design and/or selection of the implant, surgical tools, and the planning of the surgical procedure itself. Various objectives of these newer systems can include: (1) reducing the amount of bony anatomy removed to accommodate the implant, (2) designing/selecting an implant that replicates and/or improves the function of the natural joint, (3) increasing the durability and functional lifetime of the implant, (4) simplifying the surgical procedure for the surgeon, (5) reducing patient recovery time and/or discomfort, and/or (6) improving patient outcomes. Because "patient-specific" and "patient-engineered" implant systems are created using anatomical information from a particular patient, such systems are generally created after the patient has been designated a "surgical candidate" and undergone non-invasive imaging. But, because such systems are not generally pre-manufactured and stockpiled in multiple sizes (as are traditional systems), there can be a considerable delay between patient diagnosis and the actual surgery, much of which is due to the amount of time necessary to design and manufacture the "patient-specific" and/or "patient-engineered" implant components using patient image data. Hence, document WO2014047514A1 discloses methods for efficiently 3D-printing implants.

Present day techniques using an implant to heal fractures focus on healing bones, but tend not to be specifically designed to heal a fractured joint. Such fractures tend to be very complicated due to the presence of many different bone fragments. Indeed, it often is difficult to see clearly how the bones and bone fragments of the fractured joint can be put in the correct position and be fixated in that position. The present invention aims to address this and other problems, by providing an implant which is patient-specific and fracture-specific, particularly for a fractured joint.

Document WO 2017/127887 A1 discloses a method and system for producing a digital model of a customised device, comprising the steps of: importing a first digital file of a base part; importing a second digital file of a target shape; determining a warping interpolation function based on source point positions associated with the base part and target point positions associated with the target shape; and applying the warping interpolation function to the points of said base part to generate a model of said customised device. It offers the user to manually position a base shape to aligned broken bones. This document, however, is not specifically related to treating joint fractures. It would seem that the teaching of this document does not address reduction of a fractured joint to ensure that all bone fragments of the fractured joint are aligned properly.

Document J. G. G. Dobbe et al., "Patient-tailored plate for bone fixation and accurate 3D positioning in corrective osteotonomy", Medical and Biological engineering & computing, vol. 51, no. 1-2, pp. 19-27, refers to 'a patient-tailored plate for malunion treatment'. Also this document is concerned with malunions. A malunion is a bone that healed with wrong alignment. The starting point is therefore one bone. The present invention, however, is particularly concerned with fractured joints.

SUMMARY OF THE INVENTION

The present invention concerns a method for obtaining an implantable plate for healing a fractured joint of a patient, comprising the steps of:
1) providing a 3D representation of a bone structure in a zone around a joint fracture, the zone comprising essentially all fragments of broken or ruptured bones and at least the ends of unbroken bones which form part of the fractured joint;
2) identifying different bone fragments within said 3D representation;
3) simulating a reduction of said bone fragments into a full joint;
4) calculating optimal parameter values for an implantable plate;
5) obtaining the implantable plate taking into account the calculated parameter values, whereby in step 3, the reduction is simulated by automatedly fitting positions and orientations of said bone fragments to a 3D representation of a healthy joint of said patient.

In a preferred embodiment, all bone fragments which need to be directly fixated to the implantable plate are identified on the basis of the identification of the bone fragments in step 2 and/or on the basis of the simulation of the reduction in step 3.

In a preferred embodiment, wherein the optimal parameter values comprise:

a set of positions of screw holes for the implantable plate;
a set of orientations of screw holes for the implantable plate, and/or
a set of diameters of screw holes for the implantable plate.

In a more preferred embodiment, the set of positions, orientations and/or diameters of screw holes are optimized to fixate the bone fragments which need to be directly fixated to the implantable plate.

In a preferred embodiment, step 5 comprises the step of:
5a) composing instructions for manufacturing, preferably by 3D printing, the implantable plate on the basis of the calculated parameter values.

These instructions are preferably obtained using the further steps of:
iv) calculating optimal parameter values for a positioning guide device, and
v) composing instructions for manufacturing, preferably by 3D printing, the positioning guide device on the basis of the calculated parameter values.

Preferably, a patient-specific and fracture-specific implantable plate for healing a fractured joint of a patient is manufactured, preferably by 3D printing the implantable plate, using the instructions obtained in step 5a.

In preferred embodiments, the fractured joint is an intra-articular fracture or a metaphyseal fracture.

In a preferred embodiment, in step 2, essentially all different bone fragments comprising a size which is at least a predefined limit size in the zone around the joint fracture are identified, said limit size preferably being at most 3 mm, more preferably at most 2 mm, still more preferably at most 1 mm.

The present invention also concerns an implantable plate for healing a fractured joint of a patient, said implantable plate being patient-specific and fracture-specific and obtainable by a method according to the present invention.

In a preferred embodiment, the implantable plate comprises a number of at least two screw holes, preferably at least three screw holes, which comprise non-parallel orientations with respect to one another. Note that in the case of three or more screw holes, the orientation of each of the screw holes is preferably non-parallel with all of the other screw holes. This is particularly advantageous to ensure that the implantable plate cannot easily loosen by forces in the direction of the screws and/or screw holes, since in such case there is no single direction for the crews and/or screw holes. This is particularly preferable for the at least two screw holes, and preferably the at least three screw holes, being positioned in a shaft portion of the implantable plate, the shaft portion hereby referring to a portion of the plate which is intended to be attached directly to a healthy bone or a healthy portion of a bone of the fractured joint. For instance, if the fractured joint is a wrist, and the ulna of the wrist is broken or ruptured, the two, three or more screw holes can be positioned in a shaft portion of the implantable plate which is to be attached to a healthy portion of the ulna.

The present invention also concerns a method for obtaining a positioning guide device for an implantable plate for healing a fractured joint of a patient, comprising the following steps:
i) providing a 3D representation of a bone structure in a zone around a joint fracture, preferably the zone comprising essentially all fragments of broken or ruptured bones and at least the ends of unbroken bones which form part of the fractured joint;
ii) identifying different bone fragments within said 3D representation;
iii) simulating a reduction of said bone fragments into a full joint;
iv) calculating optimal parameter values for a positioning guide device;
v) obtaining the implantable plate taking into account the calculated parameter values,
whereby in step iii, the reduction is simulated by automatedly fitting positions and orientations of said bone fragments to a 3D representation of a healthy joint of said patient.

In a preferred embodiment, step iv) comprises providing an implantable plate or instructions for manufacturing an implantable plate, and calculating the optimal parameter values for the positioning guide device taking into account said provided implantable plate or said instructions for manufacturing the implantable plate. This allows to manufacture the best positioning guide device specific for the implantable plate. Preferably the method comprises the step of providing indications for the positions and/or orientations of one or more screw holes on the positioning guide device.

Preferably hereby, step v comprises the step of:
va) composing instructions for manufacturing, preferably 3D printing, the positioning guide device on the basis of the calculated parameter values, Preferably, the method comprises the step of manufacturing, preferably 3D printing, the guide device using the instructions.

The present invention also relates to a guide device obtained according to a method as described in this document. Preferably, the guide device is provided with indications for the positions and/or orientations of one or more screw holes. More preferably, these indications comprise indications for the screw holes in a shaft portion of the implantable plate, the shaft portion hereby referring to a portion of the plate which is intended to be attached directly to a healthy bone or a healthy portion of a bone of the fractured joint.

The present invention also relates to a medical kit comprising an implantable plate according to the present invention, and a fixation system comprising a set of screws, whereby preferably the screws of the set are selected taking into account the number of screw holes in the implantable plate.

The present invention also concerns a computer program product comprising instructions for three-dimensional (3D) printing of an implantable plate for healing a fractured joint of a patient, said instructions obtained using the steps of:
providing a 3D representation of a bone structure in a zone around a joint fracture;
identifying different bone fragments within said 3D representation;
simulating a reduction of said bone fragments into a full joint whereby the reduction is simulated by fitting said bone fragments to a 3D representation of a healthy joint of said patient;
calculating optimal parameter values for an implantable plate;
composing instructions for 3D printing the implantable plate on the basis of the calculated parameter values, The present invention also concerns a method for manufacturing a patient-specific and fracture-specific implantable plate for healing a fractured joint of a patient by 3D printing the implantable plate using the computer program product according to the present invention, and preferably as described here above, and a patient-specific and fracture-specific implantable plate for healing a fractured joint of a patient thus obtained.

The present method also concerns a positioning guide device for positioning an implantable plate according to the present invention and a method for manufacturing such guide device by 3D printing the guide device using the computer program product according to the present invention.

Hereto, the present invention inventively combines image processing techniques, preferably implemented using an artificial intelligence (AI) algorithm and three-dimensional (3D) printing techniques.

In accordance with the present invention, one method of manufacturing an implantable plate comprises the step of obtaining a computer program product comprising instructions for three-dimensional (3D) printing of an implantable plate for healing a fractured joint of a patient according to the present invention, and the step of manufacturing the implantable plate using said computer program product.

The above method enables a surgeon to interact preoperatively with 3D images, get a reduction prediction, fine-tune the design, pre-manufacture screw directions, preferably by screw directions pre-printing, and have personalized surgical aids. The method can be realized through use of automated CT analysis, predictive models for fracture fragment recognition and reduction, an implementation of an optimal material/strength ratio in the manufacturing of the implantable plate, and many further benefits.

In a preferred embodiment, the implantable plate comprises, and more preferably is integrally made of, a biodegradable material such as a biodegradable synthesized polymer. This allows omission of hardware (HW) removal and thus eliminates the need of surgical plate removal procedure. Alternatively or additionally, the implantable plate comprises, and more preferably is integrally made of, a metal such as titanium or stainless steel.

In a preferred embodiment, the implantable plate is made integrally of a single material.

BRIEF DESCRIPTION OF THE DRAWINGS

FIGS. 7A, 7B, and 7C illustrate a number of tiltable washers of different shapes connected at an insertion end of a screw component in accordance with some embodiments.

FIG. 8 illustrates a tiltable washer allowing a counter-screw component to be attached onto a screw component with an even spreading of the force over the surface of the washer in accordance with some embodiments.

DETAILED DISCUSSION OF THE INVENTION

Figure 1A:
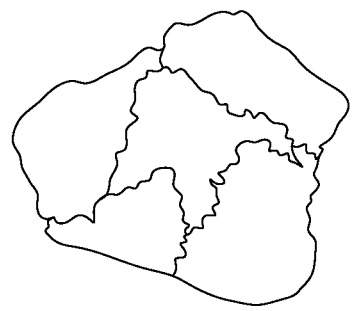
FIGS. 1A, 1B, and 1C show the segmentation of the 3D representation of a fractured joint in accordance with some embodiments.

The present invention allows obtaining an implantable plate for healing a fractured joint of a patient, by:
1) providing a 3D representation of a bone structure in a zone around a joint fracture, the zone comprising essentially all fragments of broken or ruptured bones and at least the ends of unbroken bones which form part of the fractured joint;
2) identifying different bone fragments within said 3D representation;
3) simulating a reduction of said bone fragments into a full joint;
4) calculating optimal parameter values for an implantable plate;
5) obtaining the implantable plate taking into account the calculated parameter values, whereby in step 3, the reduction is simulated by automatedly fitting positions and orientations of said bone fragments to a 3D representation of a healthy joint of said patient.

In a preferred embodiment, step 5 comprises the step of:
5a) composing instructions for manufacturing, preferably for 3D printing the implantable plate on the basis of the calculated parameter values.

This allows one to obtain a computer program product comprising said instructions for manufacturing, preferably by 3D printing, the plate.

As such, the present invention allows manufacturing of an implantable plate by first obtaining a computer program product comprising instructions for manufacturing, preferably by three-dimensional (3D) printing, of the implantable plate for healing a fractured joint of a patient, said instructions obtained using the steps of:
1) providing a 3D representation of a bone structure in a zone around a joint fracture;
2) identifying different bone fragments within said 3D representation;
3) simulating a reduction of said bone fragments into a full joint;
4) calculating optimal parameter values for an implantable plate;
5) composing instructions for manufacturing, preferably by 3D printing, the implantable plate on the basis of the calculated parameter values,
whereby in step 3, the reduction is simulated by fitting said bone fragments to a 3D representation of a healthy joint of said patient.

The implantable plate can then preferably be manufactured, preferably by 3D printing, the implantable plate using the computer program product comprising the instructions.

The instructions for manufacturing, preferably 3D printing, in the computer program product may preferably comprise a 3D representation of the implantable plate.

The instructions for manufacturing, preferably 3D printing, in the computer program product may preferably comprise a set of material parameters with regards to the material that is to be used for manufacturing, preferably 3D printing, of the implantable plate.

In a preferred embodiment, the instructions for 3D printing comprise direct instructions for steering a 3D printer or 3D printer software in order to 3D-print the implantable plate. However, the instructions for 3D printing may be limited to information allowing a further user or computer product to compose direct instructions for steering a 3D printer or 3D printer software in order to 3D-print the implantable plate.

Some embodiments of the methods for obtaining the implantable plate comprise any or any combination of the following:
- 3D printing, also called additive manufacturing;
- controlled robotic bending;
- machine milling;
- molding, e.g. injection moulding Hereby, the method of manufacturing may depend upon predefined specifications, such as the type of material that needs to be used.

We note that document WO 2017/127887 A1 describes a large number of possibilities for producing a digital model of a customised device, but fails to disclose a clear an unambiguous set of steps to follow in order to allow manufacturing an implant for healing a fractured joint. Fractures joints are more difficult to reduce than other fractures, due to a larger number of bones and bone fragments, as well as the positions thereof which allow normal functioning of the joint. It is the inventors insight that all essential fragments of broken or ruptured bones and at least the ends of unbroken bones which form part of the fractured joint need to be incorporated in order to ensure a good reduction simulation.

Furthermore, the document does not refer to adapting certain parameters such as the positions and orientations of screw holes taking into account the simulated reduction of the bone fragments.

The present invention relates to automatic identification and reduction of intra-articular or metaphyseal bone fracture fragments close to or in a joint, with accompanying fracture comminution, impaction of the bone fragments and bone loss, which is typically the case. Note that this is not necessary in malunion cases. The calculation of optimal parameter values for an implantable plate, and e.g. the instructions for manufacturing, preferably by 3D printing, are also different in metaphyseal fracture cases, because important fracture fragments need to be supported and this can be different in every fracture case. Therefore the optimal screw position and direction needs to be determined based on the fracture pattern. This is not an issue in malunion cases, as the osteotomy cut is planned and controlled. The starting point in these metaphyseal fractures is therefore multiple bone fragments. Malunited and fractured bones require a completely different approach.

The steps will now be outlined and discussed in more detail.

Step 1: Providing a 3D Representation of a Bone Structure in a Zone Around a Joint Fracture In a preferred embodiment, step 1 comprises the steps of
a) providing medical images of the bone structure of a zone around a fracture, and
b) reconstructing a three-dimensional (3D) representation of the bone structure around the joint fracture on the basis of said medical images.

Medical images hereby are preferably obtained using X-ray photography or X-ray tomography, more preferably using a CT scan. X-ray based medical images are very suitable for imaging bone structure.

In a preferred embodiment, the medical images are provided in the DICOM standard.

With the eye on performing step b, the medical images in step a are provided in such a way as to allow at least a partial three-dimensional reconstruction of the zone around the fracture.

The zone around the fracture preferably comprises all fragments of broken or ruptured bones, as well as at least the ends of unbroken bones which form part of the fractured joint.

Reconstruction of a 3D representation of the bone structure may involve an analysis of the medical images. In view of this step b, the medical images provided in step a should allow such 3D reconstruction.

In a preferred embodiment, reconstructing the 3D representation of the bone structure comprises reconstructing surfaces of bones of said bone structure.

Step 2: Identifying Different Bone Fragments Within Said 3D Representation

A number of different techniques exist to identify different bone fragments within the 3D representation of the bone structure in the zone around the fractured joint.

In preferred embodiments, the bone fragments are identified by segmenting the bone fragments on the basis of CT images of the fractured joint.

As an exemplary technique for segmentation of bone fragments, we refer to the article "Bone Fragment Segmentation From 3D CT Imagery" by Waseem Shadid et al., published in Computerized Medical Imaging and Graphics 66, February 2018, which presents a method to segment bone fragments imaged using 3D Computed Tomography (CT). Existing image segmentation solutions often lack accuracy when segmenting internal trabecular and cancellous bone tissues from adjacent soft tissues having similar appearance and often merge regions associated with distinct fragments. These issues create problems in downstream visualization and pre-operative planning applications and impede the development of advanced image-based analysis methods such as virtual fracture reconstruction. The proposed segmentation algorithm uses a probability-based variation of the watershed transform, referred to as the Probabilistic Watershed Transform (PWT). The PWT uses a set of probability distributions, one for each bone fragment, that model the likelihood that a given pixel is a measurement from one of the bone fragments. The likelihood distributions proposed improve upon known shortcomings in competing segmentation methods for bone fragments within CT images. A quantitative evaluation of the bone segmentation results is provided that compare our segmentation results with several leading competing methods as well as human-generated segmentations. Note that this paper relates generally to bone fragments and not particularly to bone fragments of a fractured joint. It is the present inventor's insight that this technique may nevertheless be used in a preferred embodiment of the present invention.

In a preferred embodiment, at least two bone fragments are identified, More preferably, at least three bone fragments are identified, such as 3, 4, 5, 6, 7, 8, 9 or 10 bone fragments. As the fracture of a joint can be very intricate, it is important to identify as much bone fragments as possible, preferably all bone fragments in the zone around the joint fracture.

Step 3: Simulating a Reduction of Said Bone Fragments Into a Full Joint

Reduction is a procedure to realign the bone fragments of a fracture. When a bone fractures, the fragments lose their alignment in the form of displacement or angulation. For the fractured bone to heal without any deformity the bony fragments must be re-aligned to their normal anatomical position. Orthopaedic surgery attempts to recreate the normal anatomy of the fractured bone by reduction of the displacement. In the present invention, the reduction of the bones of the fractured joint is first simulated. Simulation of the reduction prior to the actual reduction allows the surgeon to better prepare the operation. Additionally, in the present invention, the simulation allows to compute the parameters for the implantable plate.

An exemplary way of 3D bone fragment reduction is provided in "Virtual 3D bone fracture reconstruction via inter-fragmentary surface alignment", Beibei Zhou et al., Published in: 2009 IEEE 12th International Conference on Computer Vision Workshops, ICCV Workshops. This paper presents a system for virtual reconstruction of comminuted bone fractures. The system takes as input a collection of bone fragment models represented as surface meshes, typically segmented from CT data. Users interact with fragment models in a virtual environment to reconstruct the fracture. In contrast to other approaches that are either completely automatic or completely interactive, the system attempts to strike a balance between interaction and automation. There are two key fracture reconstruction interactions: (1) specifying matching surface regions between fragment pairs and (2) initiating pairwise and global fragment alignment optimizations. Each match includes two fragment surface patches hypothesized to correspond in the reconstruction. Each alignment optimization initialized by the user triggers a 3D surface registration which takes as input: (1) the specified matches and (2) the current position of the fragments. The proposed system leverages domain knowledge via user interaction, and incorporates recent advancements in surface registration, to generate fragment reconstructions that are more accurate than manual methods and more reliable than completely automatic methods.

The method of the prior art discussed here, however, is not particularly related to joint fractures, and furthermore relates to a reduction step which is partially manual and partially automated. One main shortcoming of this method is that the technique relies heavily on the surgeon's experience and abilities to obtain a good reduction simulation. And even if the surgeon is experienced and very capable, good reductions remain difficult. The present inventor therefore has found that the quality of the reduction simulation can be drastically improved, and fully or nearly fully automated, if the reduction is simulated by fitting said bone fragments to a 3D representation of a healthy joint of said patient.

Hereby, the 3D representation of a healthy joint of said patient can be obtained via a number of ways.

Firstly, one could have such 3D representation of medical images allowing to reconstruct such 3D representation of the healthy joint of the patient already from a previous medical check-up. This may be the preferred option, if available.

If not available, the 3D representation of the healthy joint of the patient can preferably be based on medical images of the contralateral joint to the fractured joint. Contralateral joints have been found to coincide with each other's mirror reverse by up to 98% or more. Hence, using a mirror reverse of the contralateral joint, and a 3D representation thereof, in the present invention provides a great advantage:
- unless the contralateral joint has also been broken in the past, it is always available;
- the 3D representation of the healthy contralateral joint may be obtained by obtaining medical images of the bone structure in the zone around the contralateral joint. These medical images are preferably obtained in the same manner and/or at or around the same time as the medical images of the bone structure at the zone around the fractured joint. This allows better comparison, as systematic errors on obtaining the images can be reduced;
- using medical images of the healthy contralateral joint to obtain a 3D representation thereof, allows a direct comparison, without or with only few image-processing steps.

In some cases, a 3D representation of the healthy joint or a healthy contralateral joint are not available. In such cases, it is a preferred embodiment of the present invention that the 3D representation of the healthy joint of the patient is based on a shape extrapolation of said bone fragments. Shape extrapolation refers to a technique where the shape of the joint is extrapolated from:
- the shape and size of an intact portion of a bone fragment of said fractured joint. Hereby, the bone fragment may typically show a portion which is clearly intact on e.g. the 3D representation or directly on medical images, from which the full intact bone can be extrapolated, in particular with respect to the full size and/or full shape. Possibly such extrapolation can be performed taking into account a number of other parameters, such as age, size and/or weight of the patient. Correlations between different portions of the bone exist, which allow such reconstruction, and/or
- the identified bone fragments by extrapolating the bone fragments near the edges. This can for instance be done by obtaining and/or calculating the position of the edges, the gradients at or near the edges and/or the curvatures at or near the edges of a bone fragment, and by comparing these with the same quantities of edges of other identified bone fragments.

In a preferred embodiment of the invention, step 3 comprises reconstructing the 3D representation of a healthy joint of said patient obtained via a combination of:
- a 3D representation of the healthy joint of the patient which was previously obtained, e.g. during a previous medical check-up;
- a 3D representation of the healthy joint of the patient which is based on medical images of the contralateral joint to the fractured joint, and/or
- a 3D representation of the healthy joint of the patient which is based on a shape extrapolation of the bone fragments.

Step 4: Calculating Optimal Parameter Values for an Implantable Plate

In a preferred embodiment, step 4 comprises any or any combination of the following steps:
c) selecting a template plate from a set of templates for implantable plates for healing said fractured joint, preferably combined with the step of calculating optimal parameters for said selected template plate;
d) calculating an optimal plate thickness or optimal plate thickness profile;
e) selecting a material from a set of materials for implantable plates;

In step c, the templates of the set of templates are particularly suited for the healing of the specific joint, e.g. the set of templates is particularly provided for healing a wrist fracture. The selection which can be made then preferably comprises selecting on the basis of a shape of the template. Alternatively or additionally, the selection may also be performed on the basis of the number of screw holes, the position of the screw holes and/or the orientation of the screw holes in the template plate. Further, if a template plate is selected, the present method preferably comprises the step of manufacturing a positioning guide device, preferably in accordance with the method for manufacturing a positioning guide device as disclosed in the present document.

The parameter values are optimal if they allow fixation of the essential bones and bone fragments in the zone around the joint fracture, preferably with a minimum of material, in particular preferably with a minimum of fixation screws. Optionally, the optimal values are calculated taking into account a set of pre-imposed restrictions. Such restrictions may be restrictions on the type of material which is used, e.g. it may need to be a bio-degradable polymer which preferably can be used for 3D printing the implantable plate, but may also come under the form of limits on minimal and maximal thickness, width, length. The restrictions may also come in the form of a discrete set of template plates from which an optimal template plate can be selected, which can then optionally be further fine-tuned, e.g. by drilling screw holes with optimal positions in the selected template, optimal orientations and/or optimal diameters.

Which parameter values can be optimised may depend on the template which is selected. When selecting the template, certain conditions can be imposed rather whereas other parameters can vary within ranges which could also be specified for each template. Such variable parameters typically refer to the position of screw holes, the length, width and/or thickness of portions of the plate, etc. In a preferred embodiment, the method of the present invention comprises step c of selecting a template plate from a set of templates for implantable plates for healing said fractured joint, with the additional step of customising said selected template plate. Said customisation may comprise drilling of additional screw holes, increasing a diameter of one or more screw holes, altering a screw hole direction and/or modifying the shape and/or size of the template plate, in order to better fit the calculated optimal parameter values.

In order to optimize these parameters automatically, a number of possibilities exist, for instance:
- a number of minimal or maximal conditions can be imposed, for instance with respect to torsion resistance, breaking strength, length, width, etc.;
- one or more continuous or discrete weighing functions can be used to benefit or penalize values of the parameters, e.g. for the positions of screw holes with respect to the edges of the plate or the thickness of the underlying bone fragment;
- the patient's history, e.g. a prior diagnosis of osteoporosis may lead to larger-sized screws and accordingly larger size screw holes, or any combination of the above. The optimization can then be automatically performed on the basis of the desired result. This optimization procedure may take into account past expertise of a large number of surgeons, e.g. via a self-learning algorithm which can be based on the feedback of surgeons. Hereby, not just the individual expertise of the surgeon is used, as would be the case if the surgeon needs to select the plate without the present invention.

The implantable plate needs to allow fixation of essentially all bone fragments in the zone around the joint fracture, and hence the optimization implies that preferably all fragments of broken or ruptured bones and at least the ends of unbroken bones which form part of the fractured joint are fixated when the plate is implanted. Preferably is essentially all different bone fragments comprising a size of at least a predefined limit size in the zone around the joint fracture are identified, said limit size preferably being at most 3 mm, more preferably at most 2 mm, still more preferably at most 1 mm.

Optimisation may preferably involve rewarding and/or penalizing parameter values on the basis of specific quantities, which are preferably predefined. Quantities which can be rewarded in the optimization process are preferably:
- screws to be placed in large and/or important bones or bone fragments will be rewarded, as opposed to screws in small, unimportant bones or bone fragments;
- direct contact area between bone fragments may be rewarded as this can be indicative of a good reduction simulation wherein bone fragments are fitted well together;
- stability of the simulated reduction, e.g. if the parameter values are slightly changed, how much does this change the average distance between plate and bone fragments. If it does not change much, the simulated reduction can be additionally rewarded. This is particularly preferred if the manufacturing process, e.g. 3D printing or milling, is known to lead to small deviations.

Quantities which can be penalized are preferably:
- relative displacement between the plate, the bones and/or the bone fragments of the fractured joint. Such relative displacement may be quantified by e.g. taking into account volumes in between plate, bone fragments and bones and/or non-contact surface areas of bone fragments, bones and/or plate. It may also be quantified by an average distance between bone fragments and plate and/or between different neighbouring bone fragments. Displacement may also be called 'mobility' in this context. Basically, hereby micromotion can be penalized.

Optimizable parameters for the implantable plate, in particular for a selected template plate, then preferably include any or any combination of the following:
- absolute sizes such as absolute width, length, thickness, or absolute width profile, absolute length profile, absolute thickness profile;
- relative sizes or size ratio's such as length/width ratios;
- number of screw holes;
- one or more screw hole positions;
- one or more screw hole sizes;
- one or more screw hole orientations
- types and sizes such as length and thickness of the one or more screws.

In step d, the optimal plate thickness or optimal plate thickness profile can be calculated in order to minimize the thickness while still providing enough strength to the implantable plate against excessive bending, rupturing or breaking. Note that this may depend on the material chosen for the implantable plate, i.e. steps d) and e) or preferably combined. As the optimal thickness or thickness profile may also depend on other plate parameters such as absolute and/or relative sizes, e.g. the length and width of the implantable plate, step d is preferably combined with step c.

Note that step 4 may be performed automatically or by selection of the surgeon or other specialized medical staff member, or by a combination of both. For instance, the surgeon may select the number of screw holes, whereas the positioning of the screw holes and also the orientation thereof may be automatically calculated, e.g. by maximizing subchondral support.

Step 5: Composing Instructions for 3D Printing the Implantable Plate on the Basis of the Calculated Parameter Values As discussed above, the instructions for 3D printing in the computer program product may preferably comprise a 3D representation of the implantable plate.

The instructions for 3D printing in the computer program product may preferably comprise a set of material parameters with regards to the material that is to be used for 3D printing of the implantable plate.

In a preferred embodiment, the instructions for 3D printing comprise direct instructions for steering a 3D printer or 3D printer software in order to 3D-print the implantable plate. However, the instructions for 3D printing may be limited to information allowing a further user or computer product to compose direct instructions for steering a 3D printer or 3D printer software in order to 3D-print the implantable plate.

Various technologies appropriate for manufacturing implants and tools are known in the art, for example, as described in Wohlers Report 2009, State of the Industry Annual Worldwide Progress Report on Additive Manufacturing, Wohlers Associates, 2009 (ISBN 0-9754429-5-3), available from the web www.wohlersassociates.com; Pham and Dimov, Rapid manufacturing, Springer-Verlag, 2001 (ISBN 1 -85233-360-X); Grenda, Printing the Future. The 3D Printing and Rapid Prototyping Source Book, Castle Island Co., 2009; Virtual Prototyping & Bio Manufacturing in Medical Applications, Bidanda and Bartolo (Eds.), Springer, Dec. 17, 2007 (ISBN: 10: 0387334297; 13: 978-0387334295); Bio-Materials and Prototyping Applications in Medicine, Bartolo and Bidanda (Eds.), Springer, Dec. 10, 2007 (ISBN: 10: 0387476822; 13: 978-0387476827); Liou, Rapid Prototyping and Engineering Applications: A Toolbox for Prototype Development. CRC, Sep. 26, 2007 (ISBN: 10: 0849334098; 13: 978-0849334092); Advanced Manufacturing Technology for Medical Applications: Reverse Engineering, Software Conversion and Rapid Prototyping, Gibson (Ed.), Wiley, January 2006 (ISBN: 10: 0470016884; 13: 978-0470016886); and Branner et al, "Coupled Field Simulation in Additive Layer Manufacturing," 3rd International Conference PMI, 2008 (10 pages).

Solid Freeform Fabrication (SFF) includes a group of emerging technologies that have revolutionized product development and manufacturing. The common feature shared by these technologies is the ability to produce freeform, complex geometry components directly from a computer generated model. SFF processes generally rely on the concept of layerwise material addition in selected regions. A computer generated model serves as the basis for making a replica. The model is mathematically sliced and each slice is recreated in the material of choice to build a complete object. A typical SFF machine can be likened to a miniaturized "manufacturing plant" representing the convergence of mechanical, chemical, electrical, materials and computer engineering sciences. Patient-specific and/or patient-engineered implants can be produced using 3-dimensional printing technology (also known as Solid Freeform Fabrication or "SFF") to create solid, physical implant components from an electronic or computerized data file (e.g., a CAD file or STL file). 3D printing techniques such as Selective Laser Sintering (SLS), EBM (Electron Beam Melting) and Selective Laser Melting (SLM—also known as Direct Metal Laser Sintering—DMLS—or LaserCusing) can allow the creation of durable metallic objects that are biocompatible and can directly serve as implant components.

As the surgeon still needs to check the resulting implantable plate, step 5 preferably comprises the step of manually altering the instructions. This allows the surgeon to use his or her personal experience. Clearly, since the surgeon will be the person who will have to implant the plate and has the experience of previous plates being implanted, he/she may want to make certain changes prior to printing the plate.

The present invention also concerns a computer program product for 3D printing a positioning guide device for an implantable plate for healing a fractured joint of a patient.

A positioning guide device helps the surgeon in correctly positioning the implantable plate during the surgery. As the joint is fractured and the bone fragments need to be reduced in vivo, it is helpful for the surgeon to have a guide device in which the bone fragments fit correctly, i.e. the guide device is made to fit closely onto one or more bone fragments and the surgeon can thus easily position the guide device onto said one or more bone fragments. Once fitted onto the bone fragment, the guiding device shows the positions for the fixation screws, e.g. for shaft screws, and thereby allows the surgeon the correctly pre-drill holes in the one or more bone fragments. Hence, the guide device may preferably be provided with indications for the positions and/or orientations of one or more screw holes. This allows the surgeon to pre-drill holes onto the bone fragments, resulting in better positioning and better fixation of the implantable plate to the intact part of the bone and/or the reduced bone fragments.

The computer program product for 3D printing a positioning guide device can be obtained by the following steps:
 i) providing a 3D representation of a bone structure in a zone around a joint fracture;
 ii) identifying different bone fragments within said 3D representation;
 iii) simulating a reduction of said bone fragments into a full joint;
 iv) calculating optimal parameter values for an positioning guide device;
 v) composing instructions for 3D printing the positioning guide device on the basis of the calculated parameter values,
whereby in step 3, the reduction is simulated by fitting said bone fragments to a 3D representation of a healthy joint of said patient.

Clearly, the steps i-iii needed to obtain the computer program product for 3D printing a positioning guide device are the same as the steps 1-3 to obtain the computer program product for 3D printing the implantable plate according to the invention, and steps iv-v are very similar to steps 4-5.

As such, the present invention also concerns a computer program product which combines the computer program product for 3D printing a positioning guide device and the computer program product for 3D printing an implantable plate, whereby steps 1-5 and iv-v are performed.

In a preferred embodiment, the computer program products for the plate, for the guide device or for both, will comprise an STL file. STL refers to the STereoLithography File Format Family, also referred to as "Standard Triangle Language" and "Standard Tessellation Language". The STL file format is an openly documented format for describing the surface of an object as a triangular mesh, that is, as a representation of a 3-dimensional surface in triangular facets.

Prior art reduction techniques employ a set of implantable plates which typically comprises plates of 3 different widths and multiple different lengths and many screw holes at different positions and allowing a large range of orientations for the screws, of up to 15°. The shape and the different sizes are fixed. Use of such standard-shaped plates results in complications in about 36% of the patients, due to hardware failure, malunion or tendon ruptures. In 50% of the cases, the hardware needs to be removed within about 1 year. A 59 year old male patient has a comminuted distal radius fracture at the left wrist. The distal radius fractures is fixated using one of the plates and locking screws by an experienced surgeon. Four weeks after surgery, displaced fragments are observed in X-ray images. The displacement was attributed to no purchase locking screws in crucial bone fragments for fracture stability. It is clear that this could have been prevented by using a patient-specific, fracture-specific implantable plate in according with the present invention. The present invention would have allowed to have the plate custom-sized to the patient's bone structure and to have the screw holes in the plate in positions corresponding with the crucial bone fragments and with screw orientations within at most 5°.

More difficult fractures may benefit even more from the present invention, such as OTA/AO classification types 23B/C, such as comminuted intra-articular fractures.

Volar and dorsal ulnar corner, which has the most difficult reduction and is difficult to fix. Often a crude estimation is made and/or a blind fixation is performed.

The above fracture is a wrist fracture, but the present invention can typically be applied to all types of joint fractures, preferably joint fractures of joints which have a contralateral counterpart.

A treatment using the present invention may go along the following lines.

Figure 1B:
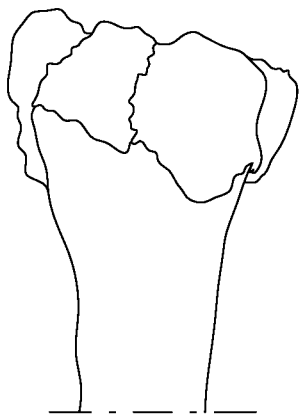
Figure 1C:
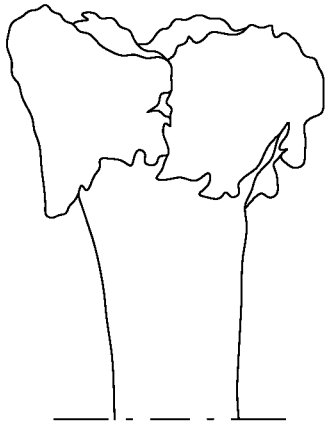

A patient has a left wrist fracture. CT scans are made of both the fractured joint (left wrist) and the healthy contralateral joint (right wrist), resulting in DICOM data for both wrists. The CT scans allow the reconstruction of a 3D representation of the bone fragments for the fractured joint and the reconstruction of a 3D representation of the bone fragments for the healthy joint. The bone fragments are identified by segmentation of the 3D representation of the fractured joint. The segmentation is shown in FIGS. 1A, 1B, and 1C.

Figure 2A:
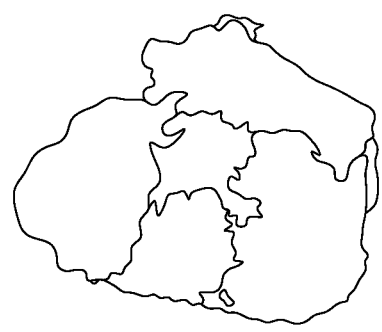
FIGS. 2A, 2B, and 2C show the reduced bone fragments in accordance with some embodiments.
Figure 2B:
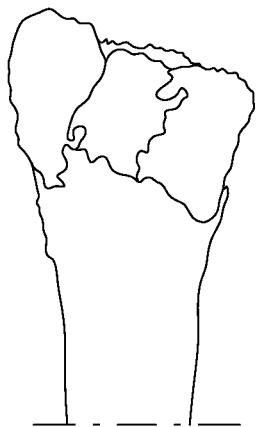
Figure 2C:
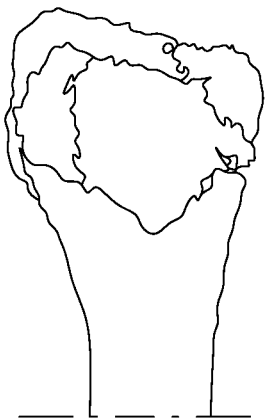

FIGS. 2A, 2B, and 2C show the reduced bone fragments. Hereby, the bone fragments have been repositioned and rotated in such a way as to most closely resemble the mirror reverse of the 3D representation of the healthy wrist. The process is automated in the sense that the best fit for the positions and orientations of the bone fragments is found using a fitting algorithm using the 3D representation of the healthy joint as reference.

Figure 3C:
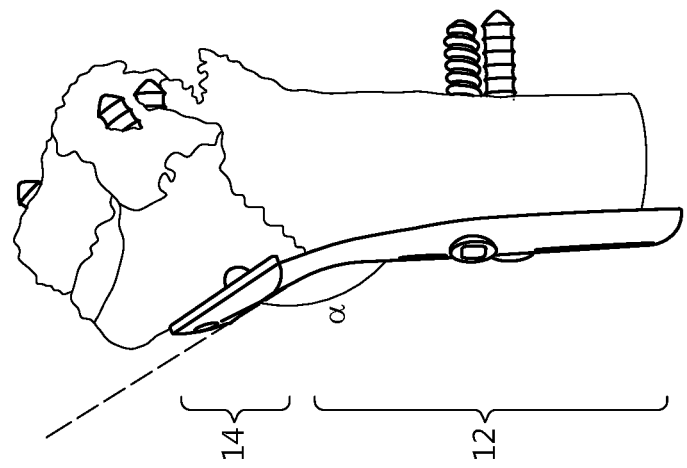
FIGS. 3A, 3B, and 3C show the parameters of a selected template implantable plate in accordance with some embodiments.
Figure 3B:
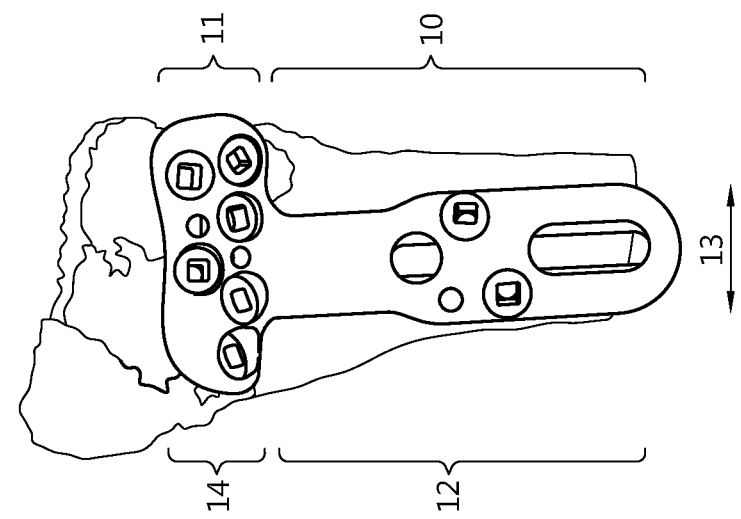
Figure 3A:
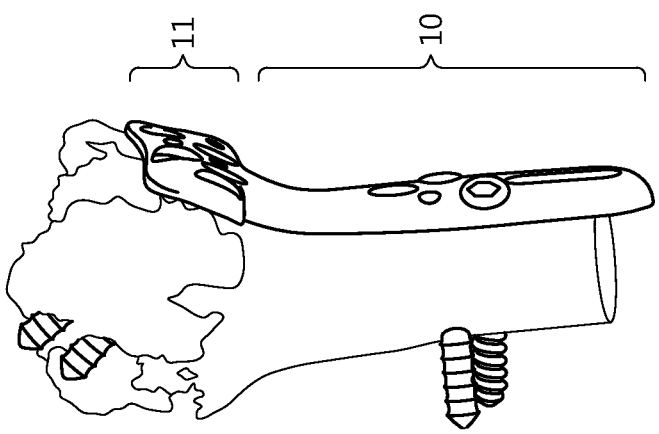

A template implantable plate is selected. In this case, the template plate is a T-like shaped plate with an elongated shaft (10) and a widened end (11). The parameters of the selected template are (see FIGS. 3A, 3B, and 3C):

Length (12) of the shaft (10)
Maximum width (13) of the shaft (10)
Length (14) of the widened end (11)
Maximum width (15) of the widened end (11)
Plate maximum thickness
Number of screw holes in the shaft. FIGS. 2A, 2B, and 2C show a template plate with a maximum of 5 screw holes in the shaft, but the method of the present invention may for instance indicate that only two screw holes need to be used or retained Number of screw holes in the widened end. FIGS. 2A, 2B, and 2C show a template plate with a maximum of 8, but the current method of which only one screw hole will be used or retained Angle (α) between the shaft and widened end Orientation of the screw holes which will be retained.

Once the parameters are known, a computer program product comprising instructions for three-dimensional (3D) printing of the implantable plate, can be composed.

Figure 4A:
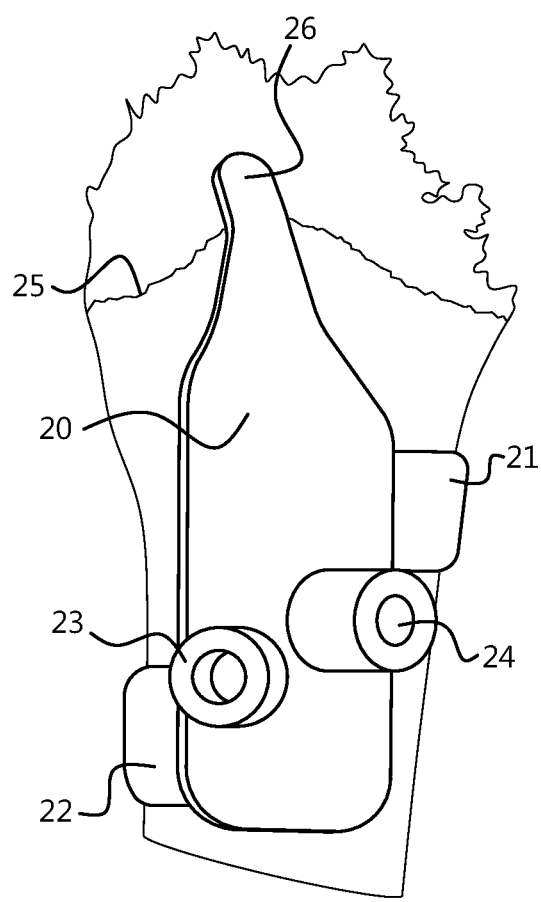
FIG. 4A shows a positioning guide device with screw holes indicating locations and orientations of drill holes for fixation of the implantable plate onto the distal radius in accordance with some embodiments.
Figure 4B:
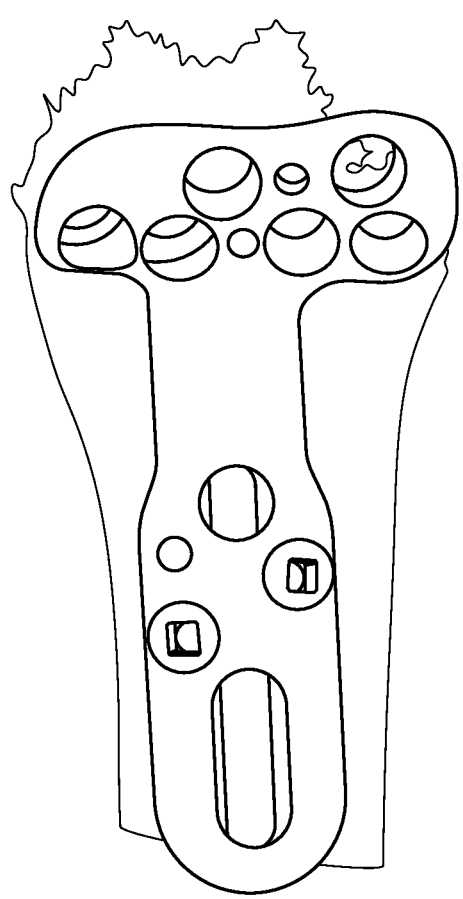
FIG. 4B shows the implantable plate fixed onto the shaft of the radius with fixation screws through the drill holes made using the positioning guide device of FIG. 4A in accordance with some embodiments.

Also, a positioning guide device (20) for guiding the positioning of the plate onto the distal radius, can be manufactured. This guide device is shown in FIG. 4A, which shows the guide positioned on the shaft of the distal radius. The guide device comprises lateral positioning portions (21,22) and a distal positioning portion (26) allowing a correct positioning of the guide device onto the radius shaft. Hereby, the lateral positioning portions (21, 22) fit to a particular portion of the bone shaft and the distal positioning portion (26) fits to a portion of the bone on the fracture line (25), which preferably is easily identifiable, such as a clear recess or protrusion. Once positioned correctly, the screw holes in the guide device (23, 24) indicate where the drill holes in the shaft of the radius need to be located, as well as how they need to be orientated. These drill holes will be used for the two fixation screws to fix the shaft of the implantable plate onto the shaft of the radius (see FIG. 4B).

In a preferred embodiment, the implantable plate comprises a widened distal end (31), a proximal shaft end (33) and a shaft (32) connecting the widened distal end (31) with the proximal shaft end (33) along a longitudinal direction. Two similar, but slightly different implantable plates according to such an embodiment are illustrated in FIG. 5 and in FIGS. 6A, 6B, 6C, and 6D.

In a preferred embodiment, the proximal shaft end of the implantable plate comprises three, and preferably not more than three, screw holes (34,35,36). The three screw holes are preferably located in a triangle-setup. Accordingly, the proximal shaft end (33) may preferably comprise a triangular shape in order to allow the triangular setup of the screw holes while limiting the amount of material which is used. This is shown in FIG. 5, wherein the proximal shaft end has a triangular shape. In a preferred embodiment, the three screw holes are located in a triangle-setup with a tip of the triangle oriented towards the outer longitudinal extremity of the implantable plate. Accordingly, if the proximal shaft end comprises a triangular shape, said proximal shaft end is oriented with a tip of the triangle at the outer longitudinal extremity.

Figure 5:
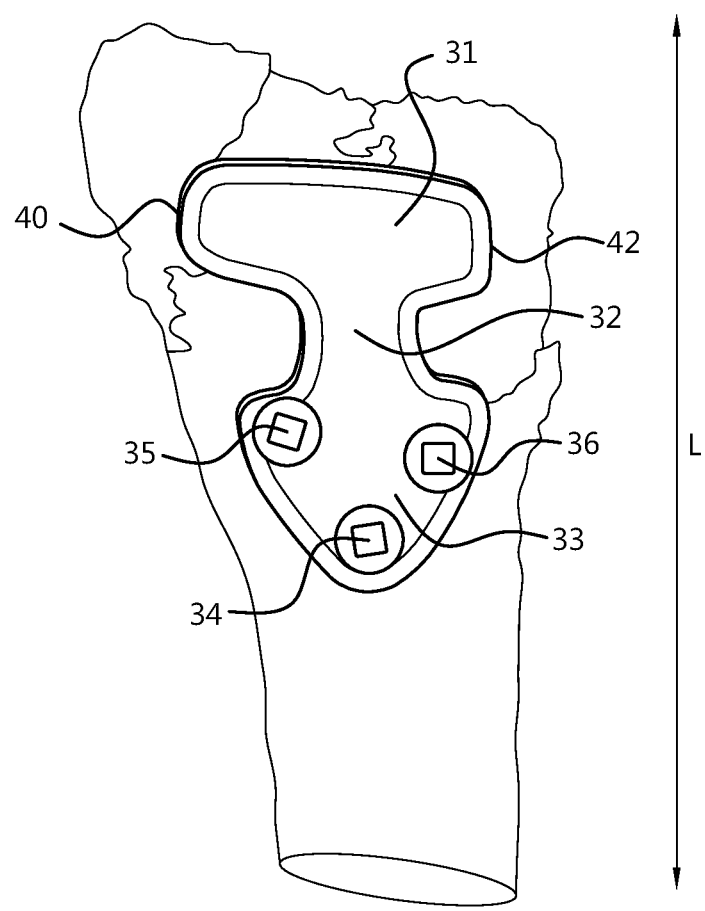
FIG. 5 illustrates an example of an implantable plate in accordance with some embodiments.

The implantable plate shown in FIGS. 6A, 6B, 6C, and 6D is similar to the one shown in FIG. 5. The main difference lies in the shape of the proximal shaft end, which in FIGS. 6A-6D is not of a triangular shape, and in the location of the three screw holes. Hence, in another preferred embodiment of the implantable plate according to the present invention and as illustrated in FIGS. 6A-6D, the proximal shaft end comprises three, and preferably not more than three, screw holes (44, 45, 46). The three screw holes are preferably located in a triangle-setup. Hereby, preferably the three screw holes are located in the triangle-setup with a tip of the triangle oriented towards the shaft (32). Such implantable plate may be preferred as it can be fixated better and more stably onto the bone shaft. In this preferred embodiment, the proximal shaft end (43) may preferably comprise a shape comprising an essentially constant width along the longitudinal direction (L).

In particularly preferred embodiments of implantable plates according to the present invention, screw holes comprise non-parallel screw directions. The screw direction relates to the direction in which the screw moves when it is inserted through the screw hole, and can be at least partially determined by the direction of the screw hole through the implantable plate. Preferably, in the present invention, the screw direction of a screw hole, and more preferably of all screw holes, is determined up to an angle of less than 7°, more preferably less than 6°, still more preferably of less than 5°. Note that the prior art allows the screw direction to vary over larger angles than this because larger angle variation allows the surgeon more possibility to adapt the screw direction during the actual surgery. However, larger variability in screw direction tends to lead to worse fixation. In the present invention, however, the pre-operative planning is performed much better than in the prior art, and thereby allows to keep the variation in screw direction small. As the surgeon tends to prefer or even require to have some possibility to vary the screw direction during the actual surgery, in a preferred embodiment, the screw direction of a screw hole, and more preferably of all screw holes, is determined to an angle of more than 1°; preferably more than 2°, such as 3°, 4° or 5°.

In an embodiment, at least two screw holes may comprise a parallel screw direction.

Figure 6A:
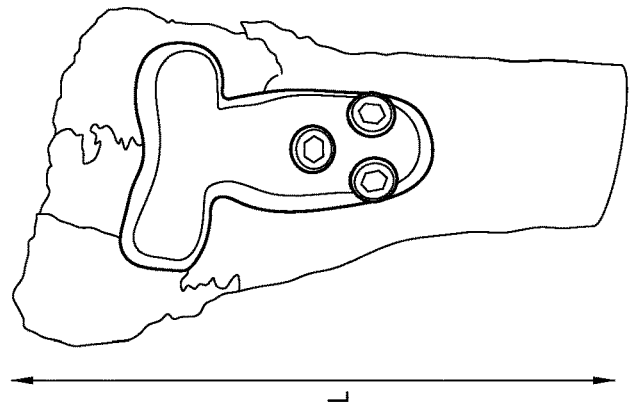
FIGS. 6A, 6B, 6C, and 6D illustrate an example of an implantable plate in accordance with some embodiments.
Figure 6B:
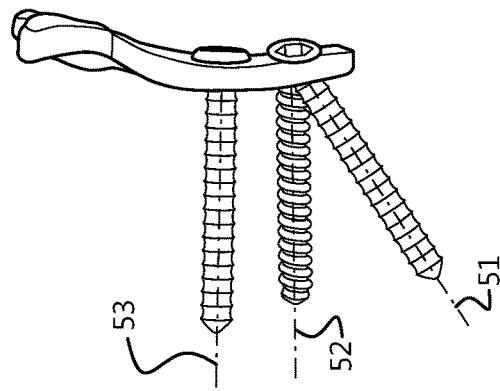
Figure 6C:
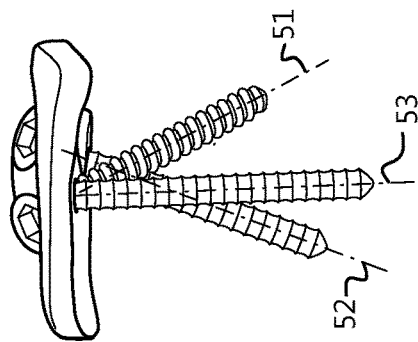
Figure 6D:
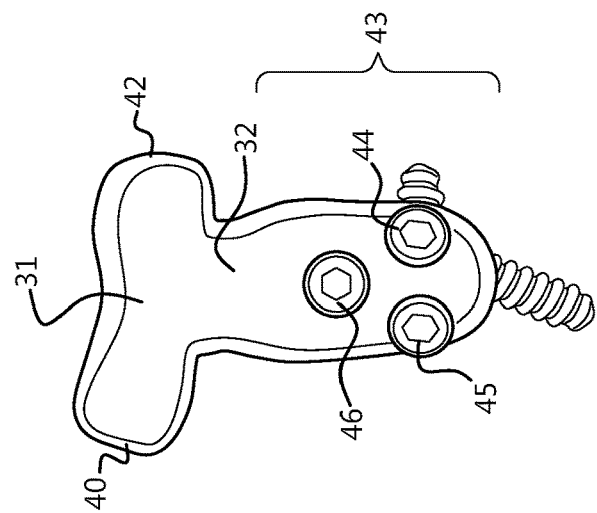

An embodiment wherein the screw directions are non-parallel is shown in FIGS. 6B and 6C, which also show the screws along the different screw directions (51,52,53). Hereby, the screw directions (52) and (53) may seem parallel in FIG. 6B, but are clearly non-parallel in FIG. 6C which shows the same plate as 6B from a different viewpoint. Note, however, that the feature of non-parallel screw directions is not limited to the embodiment illustrated in these figures, but can be applied more generally to the implantable plates of the present invention. Non-parallel screw directions are preferred over parallel screw directions because this limits the risk of the implantable plate loosening due to pulling forces in the direction of the screws.

The plate templates and the type of implantable plates illustrated in FIGS. 5 and 6A-6D are preferably used for healing wrist fractures.

Although not shown in the figure, the widened end (31) preferably comprises one or two screw holes. If the widened end comprises two screw holes, the two screw holes are preferably located near opposite transversal ends, i.e. one screw hole near a left transversal end (40) and the other screw hole near a right transversal end (42).

One more aspect of the present invention relates to a medical kit comprising the implantable plate according to the present invention, and a fixation system. Said fixation system preferably comprises a set of screws. Hereby the screws of the set are preferably selected taking into account the number of screw holes in the implantable plate.

In a preferred embodiment, the set of screws comprises one or more compression screws. A compression screw allows to compress bone fragments towards each other and thus can be used to obtain a better fixation than non-compression screws. Hereto, a compression screw preferably comprises a screw component and a counter-screw component, whereby the counter-screw component can be screwed over or into an insertion end of the screw component. Typically, the screw component can be inserted with an insertion end through a first opening of a hole, e.g. a drill hole, through one or more bone fragments, and the counter screw component can be attached to the insertion end of the screw component at or via a second opening of the hole, e.g. the drill hole, through the one or more bone fragments. The screw component and the counter-screw component can be screwed together with a larger force, but also with a more controllable force than is possible for non-compression screws. Prior art techniques typically do not make use of compression screws because:

the effects of the compression cannot always be well controlled. For instance, the use of compression screws may lead to tangential forces along a fracture surface between two bone fragments, which in turn could lead to undesired friction and even further fracture. Such tangential forces typically arise if the screw direction deviates too much from the optimal screw direction which preferably fixates the plate, a bone and/or one or more bone fragments perpendicular to one another, it is not always possible to predict where the insertion end of the screw component will be located. In current practice, a screw is inserted during surgery into the bones or bone fragments in a screw direction which can somewhat vary. As indicated above, this variation in screw direction may be quite large, e.g. typically up to 15°. Hence, it is not always clear where the insertion end of the screw will be located. Hence, it is also not easy to plan how to attach the counter-screw component to the screw component. Typically, one needs to make another incision, or one needs to perform a completely open surgery, to be able to reach opposite sides of the bone and bone fragments. Clearly, surgeons try to avoid any unnecessary incisions or completely open surgery if possible.

Therefore, the use of compression screws is usually avoided in joint fracture surgery.

However, the present invention allows better advance planning of the surgery, and allows to better control the position of the insertion end of a screw component of a compression screw. Hence, a second incision to allow the counter-screw component to be attached to the screw component, may be kept very small.

In a preferred embodiment, the compression screw comprises or is accompanied with a washer. A washer allows the force acting onto the surface of a bone fragment to be better spread out. Preferably the washer is a tiltable washer. A tiltable washer allows a counter-screw component to be attached onto a screw component with an even spreading of the force over the surface of the washer, even if the counter-screw component needs to be attached onto the screw component in a direction which is non-perpendicular to the surface of the bone or bone fragment. This is illustrated in FIGS. 7A, 7B, 7C, and 8. FIGS. 7A, 7B, and 7C illustrate a number of tiltable washers of different shapes (57, 58, 59) connected at an insertion end (56) of a screw component (61). The different shapes, e.g. circular (57), square (58), pentagonal (59) may be selected in function of the contact surface of the bone or bone fragment adjacent to the washer. FIG. 8 shows a different view of the treated joint fracture of FIG. 7B. One can see the implantable plate (60) and one screw component (61) inserted with an insertion end (56) through a screw hole in the plate and through a set of bone fragments. At the side of the joint opposite of the implantable plate (60), the tiltable washer (58) allows a counter-screw component (not shown) to be attached to the insertion end (56) even if, as shown, the insertion end of the screw component does not protrude perpendicularly out of the bone fragment's surface. Note that the washer, preferably the tiltable washer, is preferably selected to fit the compression screw, in particular if the screw is directed in the intended orientation of the compression screw as determined by the method of the present invention. The present invention allows to obtain information on the optimal orientation of the screws and thus allows upfront selection of the best screw, counterscrew, and washer with respect to size and orientation.

The use of a washer may allow to firmly attach the implantable plate without using a counter-plate on an opposite side of the fractured joint.

The invention claimed is:

1. A method for obtaining an implantable plate for healing a fractured joint of a patient, comprising:
providing a 3D representation of a bone structure in a zone around a joint fracture, the zone comprising essentially all fragments of broken or ruptured bones and at least ends of unbroken bones which form part of the fractured joint, wherein the 3D representation represents the fractured joint in a fractured state;
identifying different bone fragments within said 3D representation;
simulating a reduction of said different bone fragments into a full joint;
calculating parameter values for the implantable plate; and
obtaining the implantable plate based at least in part on the parameter values,
wherein simulating the reduction of said different bone fragments into the full joint comprises automatedly fitting positions and orientations of said different bone fragments to a 3D representation of a healthy joint of said patient.

2. The method according to claim 1, wherein one or more bone fragments which need to be directly fixated to the implantable plate are identified based on the different bone fragments and/or based on the reduction.

3. The method according to claim 2, wherein the parameter values comprise:
a set of positions of a plurality of screw holes for the implantable plate;
a set of orientations of the plurality of screw holes for the implantable plate, and/or
a set of diameters of the plurality of screw holes for the implantable plate.

4. The method according to claim 3, wherein the set of positions, the set of orientations, and/or the set of diameters of the plurality of screw holes are selected to facilitate fixation of the one or more bone fragments which need to be directly fixated to the implantable plate.

5. The method according to claim 1, wherein obtaining the implantable plate based at least in part on the parameter values comprises:
composing instructions for 3D printing the implantable plate based on the parameter values.

6. The method according to claim 5, wherein the parameter values are first parameter values, and further comprising:
calculating second parameter values for a positioning guide device, and
composing instructions for 3D printing the positioning guide device based on the second parameter values.

7. The method according to claim 5, wherein the implantable plate is a patient-specific and fracture-specific implantable plate manufactured by 3D printing using the instructions for 3D printing the implantable plate.

8. The method according to claim 1, wherein said 3D representation of the healthy joint of the patient is based on medical images of a contralateral joint to the fractured joint.

9. The method according to claim 1, wherein said 3D representation of the healthy joint of the patient is based on a shape extrapolation of said different bone fragments.

10. The method according to claim 1, wherein calculating parameter values for the implantable plate comprises any, or any combination, of:
selecting a template plate from a set of templates for implantable plates for healing said fractured joint, based on the parameter values for said implantable plate;
calculating an optimal plate thickness or optimal plate thickness profile; and/or
selecting a material from a set of materials for implantable plates.

11. The method according to claim 1, wherein the fractured joint is an intra-articular fracture or a metaphyseal fracture.

12. The method according to claim 1, wherein identifying the different bone fragments within said 3D representation comprises identifying a plurality of bone fragments having a size of at least a predefined limit size in the zone around the joint fracture, said predefined limit size being at most 3 mm.

13. A method for obtaining a positioning guide device for an implantable plate for healing a fractured joint of a patient, comprising:
providing a 3D representation of a bone structure in a zone around a joint fracture, the zone comprising essentially all fragments of broken or ruptured bones and at least ends of unbroken bones which form part of the fractured joint,
wherein the 3D representation represents the fractured joint in a fractured state;
identifying different bone fragments within said 3D representation;
simulating a reduction of said different bone fragments into a full joint;
calculating parameter values for the positioning guide device; and
obtaining the positioning guide device based at least in part on the parameter values,
wherein simulating the reduction of said different bone fragments into the full joint comprises automatedly fitting positions and orientations of said different bone fragments to a 3D representation of a healthy joint of said patient.

14. The method according to claim 13, wherein obtaining the positioning guide device based at least in part on the parameter values comprises:
composing instructions for 3D printing the positioning guide device based on the parameter values.

15. The method according to claim 14, further comprising 3D printing the positioning guide device using the instructions for 3D printing the positioning guide device.

* * * * *